(12) United States Patent
Rey

(10) Patent No.: US 12,363,538 B2
(45) Date of Patent: Jul. 15, 2025

(54) FRAME SYNCH DETECTION WITH INTRUSION DETECTION

(71) Applicant: Cypress Semiconductor Corporation, San Jose, CA (US)

(72) Inventor: Claudio Rey, Chandler, AZ (US)

(73) Assignee: Cypress Semiconductor Corporation, San Jose, CA (US)

( * ) Notice: Subject to any disclaimer, the term of this patent is extended or adjusted under 35 U.S.C. 154(b) by 224 days.

(21) Appl. No.: 18/078,879

(22) Filed: Dec. 9, 2022

(65) Prior Publication Data

US 2023/0189000 A1  Jun. 15, 2023

Related U.S. Application Data

(60) Provisional application No. 63/408,766, filed on Sep. 21, 2022, provisional application No. 63/288,353, filed on Dec. 10, 2021.

(51) Int. Cl.
*H04W 12/122* (2021.01)
*H04W 56/00* (2009.01)

(52) U.S. Cl.
CPC ...... *H04W 12/122* (2021.01); *H04W 56/0015* (2013.01)

(58) Field of Classification Search
CPC .. H04W 12/122; H04W 56/0015; H04L 7/042
(Continued)

(56) References Cited

U.S. PATENT DOCUMENTS 5,706,314 A * 1/1998 Davis ............... H04L 7/042
370/514
7,382,846 B1 * 6/2008 Zange ............ H04L 27/2017
375/364
(Continued)

FOREIGN PATENT DOCUMENTS

EP 3264701 B1 2/2019
EP 3706380 A1 9/2020
(Continued)

OTHER PUBLICATIONS

International Search Report of PCT Application No. PCT/US2022/052597 mailed Mar. 29, 2023, 2 pgs.
(Continued)

*Primary Examiner* — Taghi T Arani
*Assistant Examiner* — Pegah Barzegar (57) ABSTRACT

Techniques are described to improve the security of frame synchronization detection between wireless devices in high accuracy positioning (HAP) applications using personal area networks (PANs). A receiver may detect whether a frame synchronization pattern has been manipulated by comparing the sampled data of the received frame synchronization pattern with a reference waveform predicted as the frame synchronization pattern. The receiver may reuse the data in the correlation buffer at the moment a correlator finds a peak and declares that the synchronization pattern is found. The correlator may also provide fractional timing information associated with the correlation peak for the receiver to create a delayed reference phase differential pattern. The receiver may subtract the data in the correlation buffer by the delayed reference differential data and look for absolute deviations in the output of such subtraction that exceed a predetermined threshold. Specific patterns or signatures of error may also be analyzed.

20 Claims, 8 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 7,486,755 | B2* | 2/2009 | Karr ...................... | H04H 60/92 |
| | | | | 370/514 |
| 7,526,016 | B2* | 4/2009 | Yuan ..................... | H04L 25/062 |
| | | | | 375/150 |
| 7,929,927 | B2 | 4/2011 | Norris et al. | |
| 7,983,308 | B1* | 7/2011 | Johnston ............... | H04J 3/0608 |
| | | | | 398/154 |
| 8,218,701 | B2* | 7/2012 | Takahashi ............. | H04J 3/0608 |
| | | | | 370/514 |
| 8,374,291 | B1* | 2/2013 | Himsoon ............... | H04L 27/22 |
| | | | | 375/343 |
| 9,794,056 | B1 | 10/2017 | Tamma et al. | |
| 10,530,905 | B1 | 1/2020 | Rey et al. | |
| 10,819,544 | B2 | 10/2020 | Stanciu et al. | |
| 10,862,505 | B1 | 12/2020 | Rey et al. | |
| 10,862,728 | B1 | 12/2020 | Rey et al. | |
| 10,862,729 | B1 | 12/2020 | Rey et al. | |
| 11,323,188 | B2* | 5/2022 | Li ......................... | H04B 1/0475 |
| 11,545,982 | B2 | 1/2023 | Perin et al. | |
| 11,621,898 | B2 | 4/2023 | Stanciu et al. | |
| 2004/0184564 | A1* | 9/2004 | Chen ...................... | H04L 7/042 |
| | | | | 375/330 |
| 2007/0025245 | A1* | 2/2007 | Porras ................... | H04W 99/00 |
| | | | | 370/252 |
| 2007/0025254 | A1 | 2/2007 | Raciborski et al. | |
| 2007/0025313 | A1* | 2/2007 | Bhagwat .............. | H04L 61/2514 |
| | | | | 370/338 |
| 2007/0153761 | A1* | 7/2007 | Fechtel ................. | H04B 1/7077 |
| | | | | 375/E1.01 |
| 2008/0244707 | A1* | 10/2008 | Bowser ................ | H04L 63/1441 |
| | | | | 726/4 |
| 2012/0269205 | A1* | 10/2012 | Haque ...................... | H04L 7/08 |
| | | | | 370/509 |
| 2015/0268350 | A1* | 9/2015 | Whitehead ................ | G01S 3/46 |
| | | | | 342/357.59 |
| 2016/0066788 | A1* | 3/2016 | Tran ....................... | A61B 5/201 |
| | | | | 340/870.07 |
| 2017/0025021 | A1* | 1/2017 | Song ........................ | G08G 5/55 |
| 2017/0094532 | A1* | 3/2017 | Ou ........................... | H01Q 15/16 |
| 2018/0114215 | A1* | 4/2018 | Cho ........................ | G06Q 20/34 |
| 2018/0372879 | A1* | 12/2018 | Whitehead ........... | G01S 19/215 |
| 2019/0065431 | A1* | 2/2019 | Amarilio ................. | G06F 1/12 |
| 2019/0293802 | A1* | 9/2019 | Kurby ................... | G01S 19/215 |
| 2020/0169334 | A1* | 5/2020 | Li ............................ | H03F 3/189 |
| 2020/0371247 | A1* | 11/2020 | Marmet ................ | G01S 19/015 |
| 2021/0072402 | A1* | 3/2021 | Cohen .................... | G01S 19/06 |
| 2022/0276389 | A1* | 9/2022 | Yu ........................... | G01S 19/21 |
| 2022/0357460 | A1* | 11/2022 | Schmidt Diaz ....... | G01S 19/215 |
| 2022/0417071 | A1* | 12/2022 | Kwon .................. | H04B 1/0475 |
| 2023/0189000 | A1* | 6/2023 | Rey ........................ | H04L 7/042 |
| | | | | 726/23 |

FOREIGN PATENT DOCUMENTS

| | | |
|---|---|---|
| EP | 3737055 A1 | 11/2020 |
| EP | 3731478 A3 | 1/2021 |
| EP | 4064568 A1 | 9/2022 |

OTHER PUBLICATIONS

Written Opinion of of PCT Application No. PCT/US2022/052597 mailed Mar. 29, 2023, 4 pgs.

Cancela et al., "Testing receiver resilience against signal replay attacks", HAL open science, 12 pgs. (Jan. 7, 2019).

* cited by examiner

FRAME SYNCH DETECTION WITH INTRUSION DETECTION

CROSS REFERENCE TO RELATED APPLICATIONS

This application claims the benefit of U.S. Provisional Application No. 63/288,353 filed on Dec. 10, 2021, and U.S. Provisional Application No. 63/408,766 filed on Sep. 21, 2022, the disclosures of which are incorporated herein by reference in their entirety.

TECHNICAL FIELD

This disclosure generally relates to technologies for positioning and ranging using wireless signals, and more particularly, to techniques for improving the security of ranging solutions using narrow-band radios such as Bluetooth technologies.

BACKGROUND

Ranging and localization applications such as secured entry, indoor positioning, asset tracking, etc., are increasingly relying on the use of narrow-band radios for personal area networks (PANs) such as Bluetooth (BT), Bluetooth Low Energy (BLE), IEEE 802.15.4, Zigbee, infrared, etc., to provide sub-meter accuracy and secure distance measurements. For example, smart tags, smart phones, smart devices, Internet-of-Things (IoT) that use short-range BLE technologies for wireless communication may use BLE radios to perform ranging and positioning of other devices.

In secured entry applications providing secure keyless entry to locked enclosures (e.g., a residence, a vehicle, a garage) or other secure resources, a person in possession of a keyless entry device such as a smartphone may exchange BLE packets with a device controlling access to the locked enclosures for the devices to estimate their mutual distances based on round trip timing (RTT) of the packets. For example, a keyless entry device may transmit a particular data pattern within a frame delimiter of a BLE packet to a device in a vehicle. The device in the vehicle may perform frame synchronization detection to verify that the particular data pattern matches an expected data pattern to provide a level of security to the keyless entry application based on distance ranging. The device in the vehicle may then unlock the door of the vehicle when the keyless entry device is estimated to be in close proximity to the vehicle. However, the distance ranging application is vulnerable to man-in-the-middle (MITM) or other spoofing attacks. An intruder seeking access to the vehicle may manipulate the timing of the BLE packets to appear in close proximity to the vehicle when the intruder is actually far away. It is desired to improve the security of keyless entry solutions against MITM attacks.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Examples of various aspects and variations of the subject technology are described herein and illustrated in the accompanying drawings. The following description is not intended to limit the invention to these embodiments, but rather to enable a person skilled in the art to make and use this invention. For example, while aspects of the disclosure are explained using Blue Low Energy (BLE) networks, the disclosed techniques are equally applicable to other types of wireless communication technologies.

Described are systems and methods for improving the security of frame synchronization (or frame synch) detection between wireless devices used in high accuracy positioning (HAP) applications using BLE, IEEE 802.15.4, or other short-range narrow-band radio technologies employed by personal area networks (PANs). Frame synchronization detection may be understood as detecting a frame delimiter, also referred to as a start frame delimiter (SFD), in a network packet that is identifying or signaling that data is to follow within a frame of the packet. Some implementations of the HAP applications use the frame synchronization detection for distance measurements between devices. For example, in HAP applications, some packets may include a frame delimiter (or SFD) without a payload (e.g., frame synchronization packets), particularly where the frame delimiter itself is initially employed for security purposes, e.g., in order to perform verification of a wireless device transmitting the frame synchronization packets. Thus, the data of a packet described herein may refer to just a preamble and a frame delimiter, also called a frame synchronization pattern, or may refer to the payload of data within the packet.

In some PAN devices, frame synchronization can be used as part of BLE distance estimation techniques, which was also previously known as BLE high accuracy distance measurement (HADM). BLE distance estimation may be achieved through a phase-based distance ranging method, or through packet exchanges in round trip timing (RTT) estimation, or a combination thereof to provide localization between wireless devices. In one example, BLE frame synchronization patterns, also known as BLE channel sounding (BLE CS) synchronization patterns, are used in RTT estimation to estimate the time of arrival (ToA) of a packet. In another example, BLE distance estimation techniques may use the frequency estimated during the RTT estimation to synchronize multiple BLE distance estimation devices through the correction of clocking errors and to estimate the phase during the phase ranging. Additionally, BLE distance estimation techniques can use frame synchronization patterns to estimate frequency for use in security features, such as intrusion detection models.

As mentioned, RTT-based ranging techniques employed for security can be spoofed and is thus susceptible to attacks. For example, RTT-based ranging can be spoofed by an attacker (such as a man-in the middle (MITM)) using a methods known as early detect late commit (EDLC) or early commit late detect (ECLD). An attacker may attempt to gain access to an enclosure or a resource secured by a BLE device such as a car in the driveway. The attacker knows that there is a key inside the house and that the car is in scan mode and can see the key inside but given its distance to the car the car door will not unlock. The attacker's device will act as a relay that repeats both the signals from the car to the key and the one from the key to the car.

For example, in an ECLD attack, the attacker's device manipulates the relayed signals from the key and from the car so that both signals are stronger and also manipulate the relayed signals to make them appear earlier. The attacker's device guesses each symbol of the BLE frame synchronization pattern bits transmitted from the key and transmits the guessed symbols to the car before the symbols from the key are intercepted by the attacker's device. Note that the attacker device may consist of two separate units with one manipulating the signal from the key to the car and the other manipulating the signal from the car to the key. Without any loss of generality, we will zoom in to the key as the transmitter and the car as the receiver. As the attacker's device intercepts each symbol from the key, the attacker's device determines if a guessed symbol being transmitted is incorrect. If it is incorrect, the attacker's device quickly corrects the transmitted symbol in time for the car's BLE receiver to perform frame synchronization detection using the symbol. In RTT-based ranging, a BLE receiver performs frame synchronization detection by correlating received data with the expected frame synchronization pattern. Frame synchronization may be declared as detected when a correlation peak crosses a detection threshold. The car's BLE receiver may detect frame synchronization despite the manipulation of the symbols of the frame synchronization pattern.

Because the BLE receiver perceives the attacker's device as appearing closer than the key due to the earlier reception of the frame synchronization pattern, the BLE receiver may be spoofed into granting the attacker access to the car. One way to detect the attack may be to determine if the correlation peak is smaller than a certain percentage of the maximum normalized value. However, a smart attacker may manipulate the symbols so that the integration of the sampled data over each symbol duration yields a correlation peak that mimics the correlation peak generated from tamper-free symbols. To remedy the security vulnerabilities associated with manipulation of the frame synchronization pattern by MITM attackers, techniques are disclosed to analyze the waveform of the frame synchronization pattern to detect signatures indicative of an attack.

In one aspect, a BLE receiver may be configured to detect a manipulated frame synchronization pattern by over-sampling each symbol of the frame synchronization pattern and comparing the sampled data of the frame synchronization pattern received from a purported secure key with a reference waveform predicted as the frame synchronization pattern from a true secure key. The BLE receiver may leverage the sampled frame synchronization pattern used by a correlator to detect the frame synchronization pattern when a correlation peak is found. The correlator may also provide fractional timing information associated with the correlation peak. The fractional timing information is configured to estimate the range to the source of the frame synchronization pattern and has a time resolution finer than the sampling resolution of the sampled frame synchronization pattern. Based on the fractional timing information from the correlator, the BLE receiver may generate the reference waveform representing the expected frame synchronization pattern that that may be matched with the sampled frame synchronization pattern. The BLE receiver may subtract the sampled frame synchronization pattern by the reference waveform to generate a deviation waveform. The BLE receiver may identify the frame synchronization pattern as originating from an attacker by determining if a peak deviation of the deviation waveform exceeds a predetermined threshold. In one embodiment, the BLE receiver may analyze the signatures or the pattern of the deviation waveform to detect characteristics of an attack. For example, the BLE receiver may determine if the largest deviation peaks align with symbol transitions or symbol repetitions of the sampled frame synchronization pattern depending on the type of symbol manipulation to detect an attack.

In one embodiment, the symbols of the frame synchronization pattern are modulated using frequency-shift-keying (FSK) technique. The sampled frame synchronization pattern may include phase differential of the sampled data separated by one symbol. The reference waveform may also include phase differential between consecutive symbols of the expected frame synchronization pattern. The phase differential data of the reference waveform may be subtracted from the phase differential data of the sampled frame synchronization pattern to generate a waveform of phase deviations whose magnitudes are compared with a predetermined phase threshold to detect an attacker. In one embodiment, both the sampled synchronization pattern and the reference waveform are in the I/Q domain to preserve the magnitude and phase information. The deviation waveform is also in the I/Q domain. The magnitude of the deviation waveform data and the magnitude of the phase of the deviation waveform data are compared with a magnitude threshold and a phase threshold, respectively, to detect an attack. Advantageously, the described approach uses all the sampled frame synchronization pattern available at the time of correlation to detect an attack, affording a more robust solution to address security vulnerabilities than identifying if the correlation peak is smaller than a certain percentage of the maximum normalized value.

Figure 1:
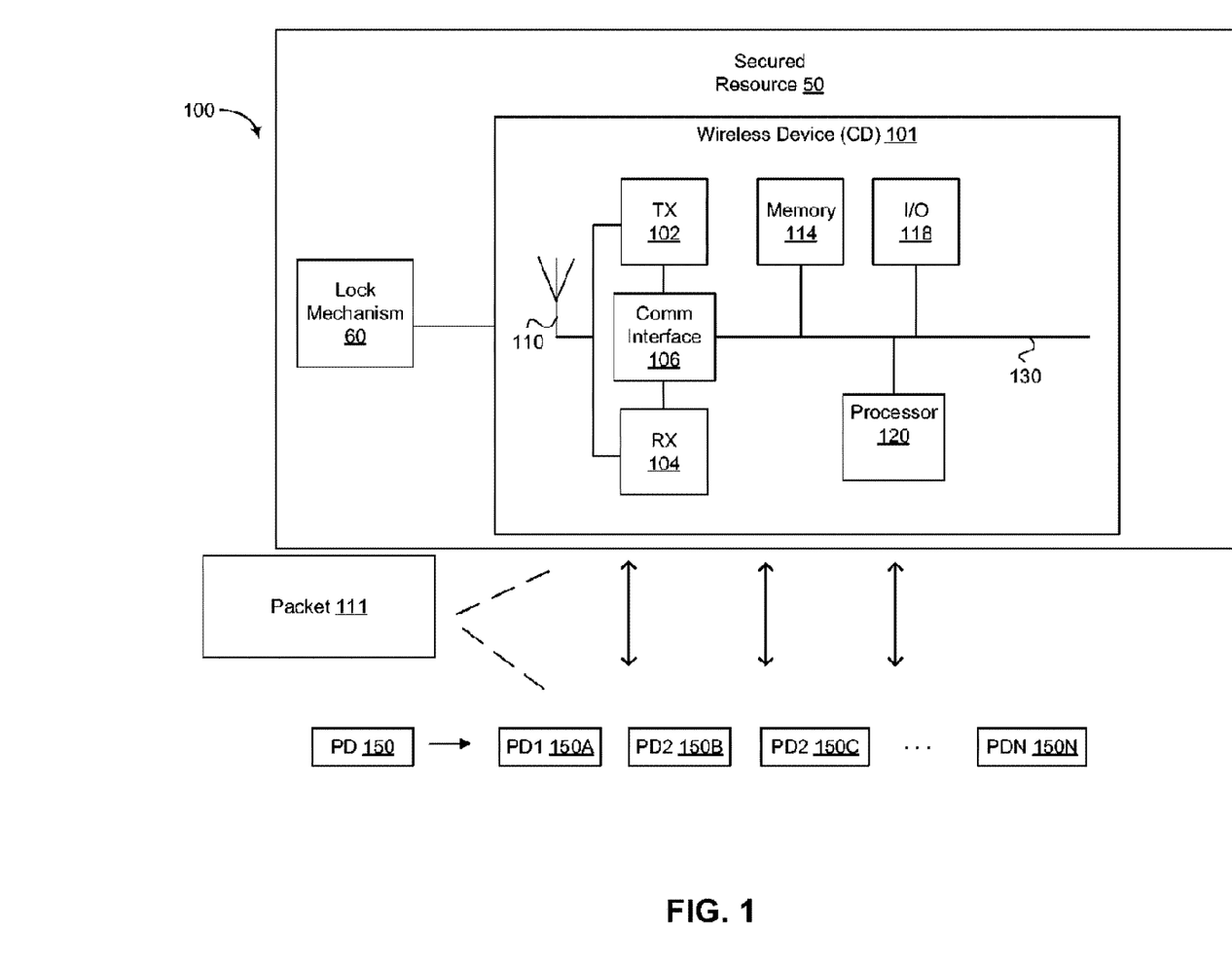
FIG. 1 illustrates a block diagram of a system useable for BLE frame synchronization detection using a security signature, in accordance with one aspect of the present disclosure.

FIG. 1 illustrates a block diagram of a system 100 useable for BLE frame synchronization detection using a security signature, in accordance with one aspect of the present disclosure. In this embodiment, a wireless device 101 acts as a central device (CD) of the BLE network and may be referred to herein as a receiving device. Further, a wireless device 150 acts as a peripheral device (PD) of the BLE network and may be referred to herein as a transmission device. The system 100 may include a secured resource 50, e.g., that is secured using a lock mechanism 60, where the peripheral wireless device 150 is adapted to gain access to the secured resource 50 via the lock mechanism 60. The secured resource 50 may be, for example, an enclosure such as a vehicle, a building, a residence, a garage, a shed, a vault, or the like. The secured resource 50 may also be a computer system, industrial equipment, or other items requiring secured access via the lock mechanism 60, which can be, for example, a digital locking mechanism. In some embodiments, the lock mechanism 60 may be integrated together with the central wireless device 101.

In some embodiments, the peripheral wireless device 150 is any one of multiple peripheral wireless devices PD1 150A . . . PDN 150N, as the central wireless device 101 may be adapted to communicate with any or all of the peripheral wireless devices PD1 150A PDN 150N. In some embodiments, the peripheral wireless device 150 is a mobile device such as a mobile phone, a smart phone, a pager, an electronic transceiver, a tablet, a keyless entry device, or the like. In these embodiments, the peripheral wireless device 150 may be adapted to gain access to the secured resource 50 by transmitting data including a frame synchronization pattern (e.g., BLE channel sounding (BLE CS) synchronization pattern) encapsulated in a frame synchronization packet 111. While the central wireless device 101 is illustrated in detail, the peripheral wireless device 150 may also include the same or similar components as the central wireless device 101, the descriptions of which are not repeated for brevity.

In some embodiments, the central wireless device 101 includes, but is not be limited to, a transmitter or TX 102 (e.g., a PAN transmitter), a receiver or RX 104 (e.g., a PAN receiver), a communications interface 106, one or more antennas 110, a memory 114, one or more input/output (I/O) devices 118 (such as a display screen, a touch screen, a keypad, and the like), and a processor 120. These components may all be coupled to a communications bus 130.

In some embodiments, a separate antenna is employed for each of the transmitter 102 and receiver 104, and so the antenna 110 is illustrated for simplicity. In some embodiments, the memory 114 may include storage to store instructions executable by the processor 120 and/or data generated by the communication interface 106. In some embodiments, front-end components such as the transmitter 102, the receiver 104, the communication interface 106, and the one or more antennas 110 described herein may be adapted with or configured for PAN-based frequency bands, e.g., Bluetooth® (BT), BLE, Wi-Fi®, Zigbee®, Z-wave™, and the like.

In some embodiments, the communications interface 106 is integrated with the transmitter 102 and the receiver 104, e.g., as a front-end of the wireless device 101. The communication interface 106 may coordinate, as directed by the processor 120, to request/receive packets from the peripheral wireless device 150. The communications interface 106 may process data symbols received by the receiver 104 in a way that the processor 120 can perform further processing, including verifying correlation between phase-based samples of data values obtained from a frame synchronization packet 111 and an expected data pattern as part of a security protocol to detect the frame synchronization pattern. The communication interface 106 may further compare the sampled data values of the frame synchronization pattern used in the correlation with a reference waveform predicted as the frame synchronization pattern to generate a deviation waveform. The communication interface 106 may analyze characteristics of the deviation waveform to detect a MITM attack, as described herein. In some embodiments, the generation of the deviation waveform and/or the detection of a MITM attack using the deviation waveform may be performed by a different module, the processor 120, or by a separate device.

Figure 2:
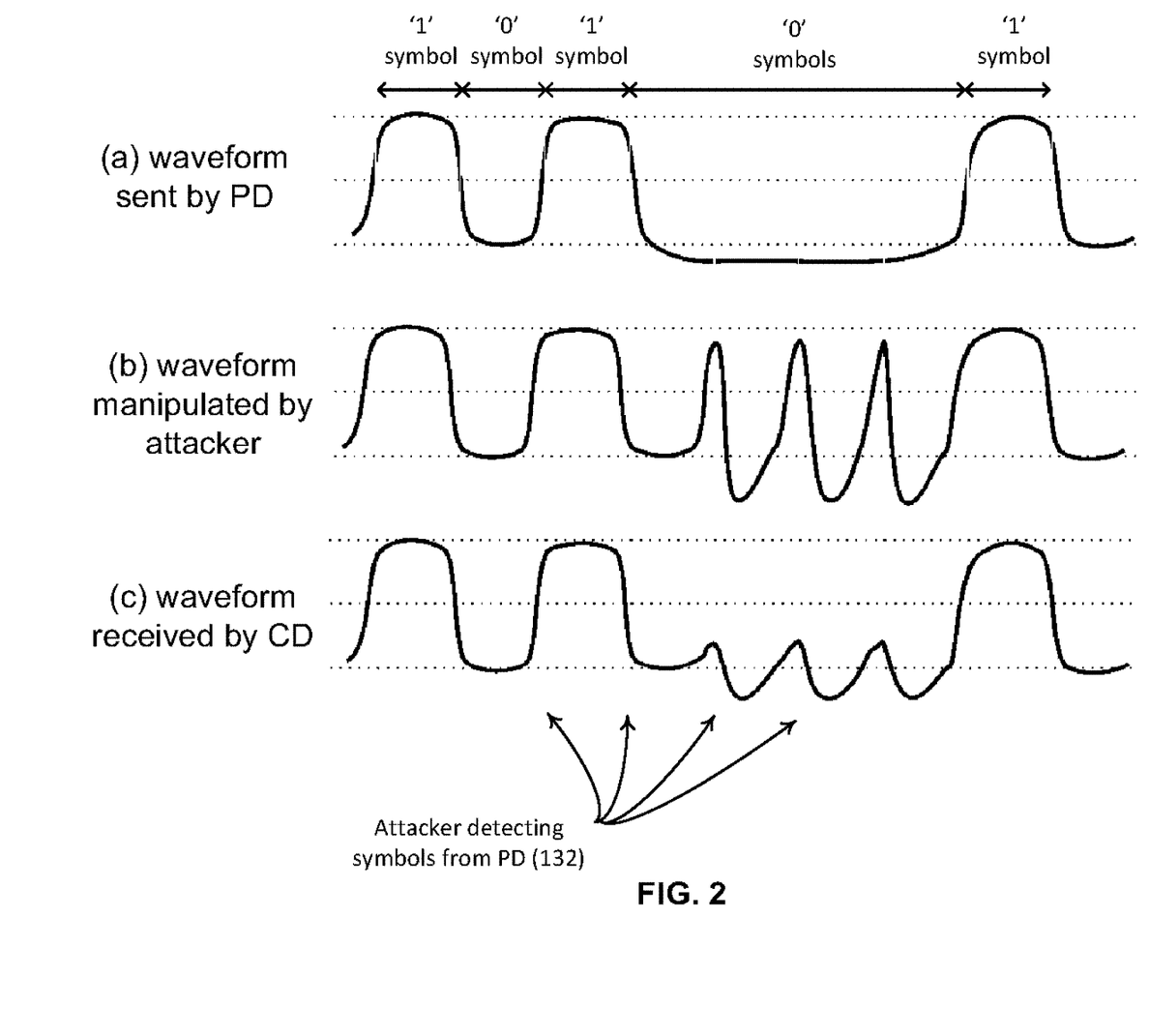
FIG. 2 illustrates an example of an ECLD attack showing the distortion added by the attacker to a frame synchronization pattern transmitted by a keyless entry device and the frame synchronization pattern as detected by a BLE receiver, in accordance with one aspect of the present disclosure.

FIG. 2 illustrates an example of an ECLD attack showing the distortion added by the attacker to a frame synchronization pattern transmitted by a keyless entry device and the frame synchronization pattern as detected by a BLE receiver, in accordance with one aspect of the present disclosure. The keyless entry device may be the peripheral wireless device 150 (PD) of FIG. 1 such as a smartphone; the BLE receiver may be the central wireless device 101 (CD) controlling access to the secured resource 50 as depicted in FIG. 1. In one embodiment, the BLE receiver may be part of a keyless entry system of a car using a RTT security technique to open the door to the car when the keyless entry device is detected to be within a close range of the car.

The keyless entry device may transmit a packet containing a BLE frame synchronization pattern (e.g., BLE CS synchronization pattern) to the BLE receiver. In one embodiment, the frame synchronization pattern may span 32 symbols transmitted with a symbol rate of 1 megabits per second (Mbps). In one embodiment, the symbols of the frame synchronization pattern may be modulated using frequency-shift-keying (FSK) technique such as Gaussian FSK (GFSK). In one embodiment, a '1' bit of the frame synchronization pattern may be transmitted with a symbol frequency offset of +250 KHz and a '0' bit may be transmitted with a symbol frequency offset of −250 KHz from the carrier frequency of the transmission. The phase change across a symbol for 1 Mbps symbol rate may thus be +/−90 degrees. Other symbol length, symbol rate, and/or modulation techniques for the frame synchronization pattern are also possible.

FIG. 2(a) illustrates a waveform of a few symbols of the frame synchronization pattern transmitted by the keyless entry device. The transmitted symbols are shown as 10100001 with the two polarities representing different frequency signals in FSK modulation. The BLE receiver is in a scan mode to detect the frame synchronization pattern and to estimate the range to the keyless entry device based on the time of reception of the frame synchronization pattern. Because the BLE receiver estimates that the keyless entry device is not close to the BLE receiver (e.g., the car is in the driveway and the keyless entry device is inside the house), the BLE receiver does not unlock the secured resource (e.g., the car door will not unlock).

An intruder seeking access to the car may use a device to launch an ECLD attack by intercepting the frame synchronization pattern from the keyless entry device (or signals transmitted by the BLE receiver to the keyless entry device). The intruder's device may act as a relay to repeat the signals so that the relayed signals are stronger and to manipulate the relayed signals so that they appear earlier to the BLE receiver to spoof the BLE receiver into believing the keyless entry device is closer so the secured resource may be unlocked.

FIG. 2(b) illustrates a waveform of the symbols of the frame synchronization pattern intercepted by the intruder's device from the keyless entry device and manipulated for transmission to appear earlier. To accomplish this, the intruder's device may assume that whenever a BLE symbol is detected, the next symbols will be the opposite polarity of the current symbol (In another embodiment, the intruder's device may assume that the next symbols will be the same polarity as the current symbol). This pattern is repeated so that the symbol following the next symbol will be assumed to be the opposite of the next symbol and so on. With this assumption, the intruder's device transmits an alternating series of symbols prior to intercepting and detecting the polarities of the symbols from the keyless entry device at times 132. When the intruder's device determines that a symbol sent is of the wrong polarity, it quickly changes the polarity of the symbol to effectively transmit a "compressed" version of the wrong polarity symbol as illustrated in FIG. 2(b). Therefore, if the polarity of the symbols from the keyless entry device is changing, the intruder's device is able to replicate the waveform. However, if there is no symbol polarity change the intruder's device has to quickly change the wrong polarity so that the apparent symbols may be correctly detected by the BLE receiver.

FIG. 2(c) illustrates a waveform of the manipulated symbols of the frame synchronization pattern as detected by the BLE receiver. The quick change to the polarity of the symbols may generate strong swings in phase in FSK modulated signals. However, the narrowband bandwidth of the BLE receiver may smooth the phase distortion so that the manipulated symbols are detected correctly. For example, the correlator of the BLE receiver may integrate of the phase of the received signals over each symbol such that the correlation peak may still exceed a detection threshold despite the phase distortion introduced by the symbol manipulation. To detect a MITM attack, techniques to detect distortions to the waveform of the frame synchronization pattern will be described.

Figure 3:
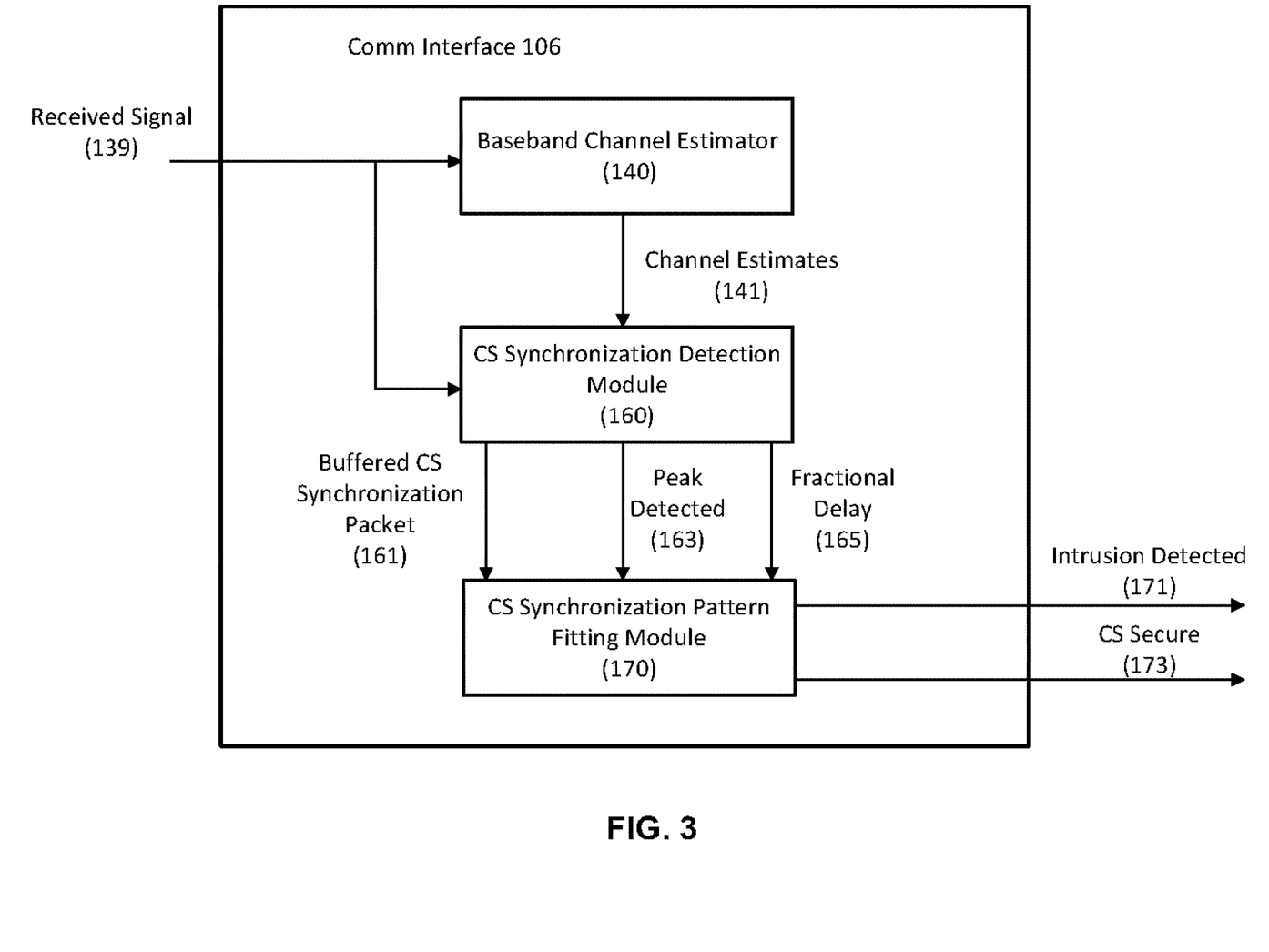
FIG. 3 illustrates a block diagram of a communication interface of a receiver configured to process received data packets containing frame synchronization patterns to detect a MITM attack or to verify a secure keyless entry device, in accordance with one aspect of the present disclosure.

FIG. 3 illustrates a block diagram of a communication interface 106 of a receiver configured to process received data packets containing frame synchronization patterns to detect a MITM attack or a to verify a secure keyless entry device (e.g., PD 150 of FIG. 1), in accordance with one aspect of the present disclosure. The communication interface 106 may be part of the central wireless device 101 (CD) of FIG. 1. The communication interface 106 may analyze deviations in the waveform of the received frame synchronization pattern from a reference waveform representing the expected frame synchronization pattern that is time aligned with the received frame synchronization pattern to detect deviations indicative of an attack.

A baseband channel estimator 140 of the communication may process received signal 139 that has been converted into baseband to estimate characteristics of a channel over which a transmission is received. The received signal 139 may include a frame synchronization pattern of a received packet. The characteristics of the channel may include a received signal strength indicator (RSSI) for the channel, an estimated channel impulse response, etc. The baseband channel estimator 140 may provide the channel estimate 141 to aid the receiver in processing the received signal 139 such as detection of the frame synchronization pattern and data demodulation.

A CS synchronization detection module 160 may process the received signal 139 to detect the frame synchronization pattern by correlating sampled data of the received frame synchronization pattern with a local copy of the frame synchronization pattern to find a correlation peak. The CS synchronization detection module 160 may also provide timing information associated with the position of the correlation peak used to estimate a distance to the transmitting source of the frame synchronization pattern. The timing information associated with the position of the correlation peak may also be referred to as the timing location of the correlation peak. When a correlation peak is detected, a CS synchronization pattern fitting module 170 may use the timing information to generate a reference waveform representing the expected frame synchronization pattern that may be matched with the sampled data of the received frame synchronization pattern. The CS synchronization pattern fitting module 170 may subtract the reference waveform from the sampled data of the received frame synchronization pattern to generate a deviation waveform. If the received synchronization pattern been manipulated such as by the ECLD attack depicted in FIG. 2(b), the deviation waveform may exhibit distortions near the beginning of symbol transitions or near the beginning of symbol repetitions depending on the how the symbols were manipulated. The waveform distortion may be analyzed to determine if the received signal 139 is received from an attacker or from a secure device. Details of the CS synchronization detection module 160 and the CS synchronization pattern fitting module 170 will be further explained.

Figure 4:
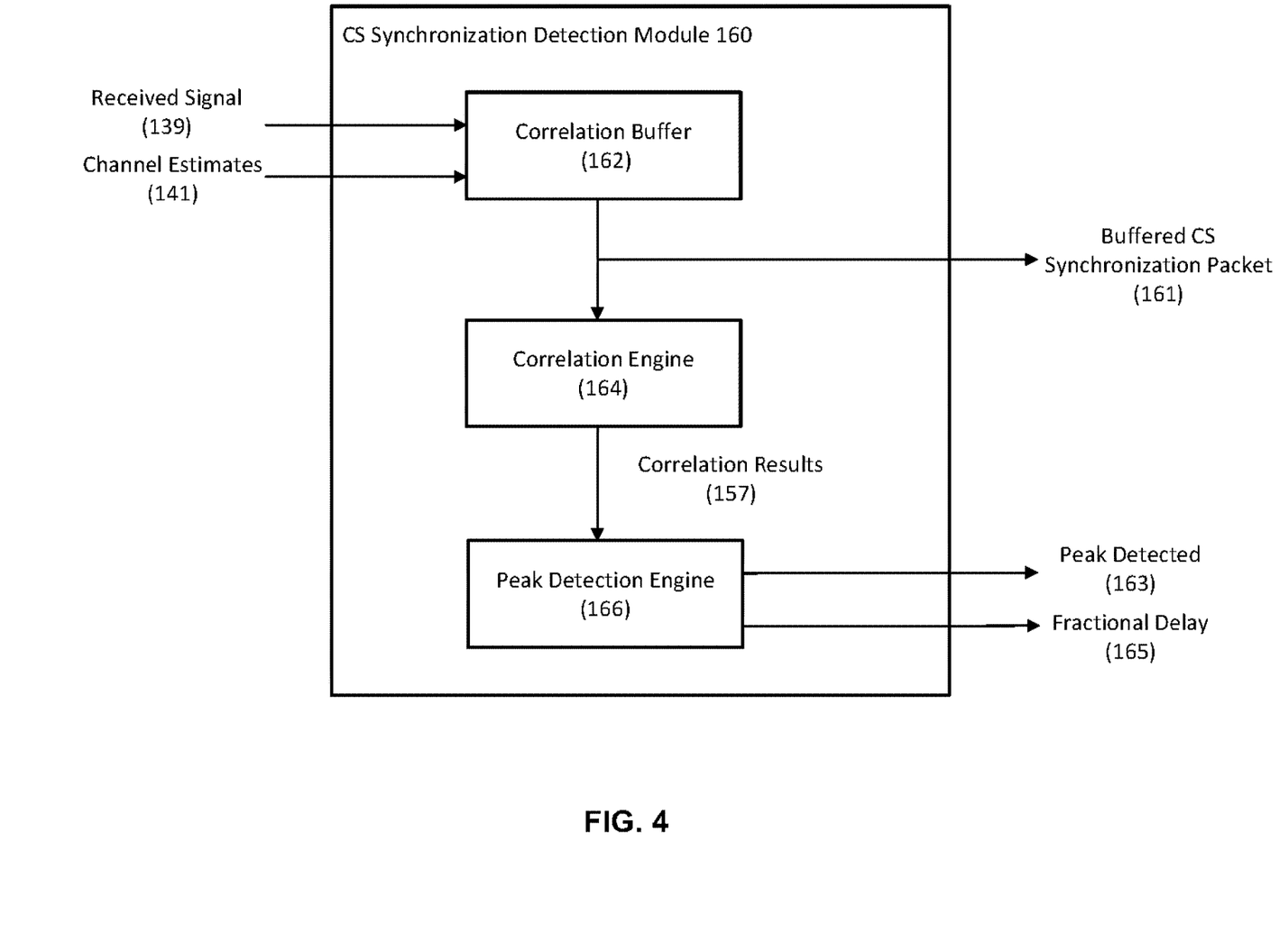
FIG. 4 illustrates a block diagram of a correlation module of the communication interface configured to detect a frame synchronization pattern and the timing of its reception, in accordance with one aspect of the present disclosure.

FIG. 4 illustrates a block diagram of a correlation module such as the CS synchronization detection module 160 of the communication interface 106 configured to detect a frame synchronization packet and the timing of its reception, in accordance with one aspect of the present disclosure. The CS synchronization detection module 160 may include a correlation buffer 162 configured to store sampled data of the received frame synchronization pattern for correlation, a correlation engine 164 that performs correlation of the sampled data of the received frame synchronization pattern with different time-shifted versions of a local copy of the frame synchronization pattern, and a peak detection engine 166 configured to detect a correlation peak when the sampled data of the received frame synchronization pattern matches a particular time-shifted version of the local copy of the frame synchronization pattern.

The correlation buffer 162 may process the received signal 139 and the channel estimates 141 provided by the baseband channel estimator 140 to generate sampled data of the received frame synchronization pattern. The correlation buffer 162 may sample the received frame synchronization pattern of the received signal 139 at a higher rate than the symbol rate of the frame synchronization pattern to generate over-sampled data. Over-sampling allows the receiver to determine the time-of-arrival (ToA) of a packet with a fine resolution using RTT-based ranging techniques. In one embodiment, the over-sampling ratio may be 6× so that if the symbol rate is 1 Mbps, the received frame synchronization pattern is sampled at 6 MHz. In one embodiment, the received signal 139 may be pre-processed based on the channel estimates 141 to compensate for distortion of the channel prior to sampling.

In one embodiment, when the frame synchronization pattern is FSK modulated, the sampled data may be converted into phase differential between sampled data separate by one symbol. For example, the sampled data for a sub-sample of a symbols may represent the difference in phase between the sub-sample of the symbol and a corresponding sub-sample of the previous symbol. In the example of 1 Mbps symbol rate and 6 MHz sampling rate, if the FSK modulation is ±250 KHz, the phase differential between sampled data separated by one symbol is expected to be ±90° and the phase differential between sampled data separated by one sample is expected to be ±15°. In one embodiment, the sampled data may be converted into differential format in the I/Q domain to represent differences in both phase and in magnitude between sampled data separate by one symbol. The correlation buffer 162 may store a running window of sampled data equal to the number of symbols in the frame synchronization pattern. For example, if the frame synchronization pattern spans 32 symbols and the sampling rate is 6×, the total number of samples in the correlation buffer 162 is 192 (32×6). The correlation buffer 162 may provide the buffered samples as buffered CS synchronization packet 161 to the correlation engine 164.

The correlation engine 164 may perform correlation of the buffered CS synchronization packet 161 with different time-shifted versions of a local copy of the frame synchronization pattern to search for the frame synchronization packet. In one embodiment, the local frame synchronization pattern may be time-shifted in increments of the time resolution of the sampling rate (e.g., ⅙ MHz). The number of time-shifted versions may be determined by a maximum range of the BLE or other PAN networks. When the sampled data of the received frame synchronization pattern matches a particular time-shifted version of the local frame synchronization pattern, a correlation peak is obtained. The correlation engine 164 may provide correlation results 157 to the peak detection engine 166.

The peak detection engine 166 receives the correlation results 157 to search for a correlation peak. The peak detection engine 166 may estimate the time of the peak based on the closest time-shifted version of the local frame synchronization pattern. The peak detection engine 166 may also obtain the correlation values before and after the peak based on the correlation results 157 obtained from the two neighboring time-shifted versions (e.g., ±⅙ MHz) of the closest local frame synchronization pattern. Based on the time of the peak and the neighboring correlation values before and after the peak, the peak detection engine 166 may estimate the ToA of the frame synchronization packet with a time resolution at a fraction of the sampled data. In one embodiment, the time resolution of the estimated ToA of the frame synchronization packet may be ¹⁄₃₂ of the sampling resolution of the data (e.g., ¹⁄₁₉₂ MHz). The peak detection engine 166 may generate a peak detected signal 163 when a correlation peak is found and a fractional delay signal 165 representing the fractional sample time for the estimated ToA. The CS synchronization detection module 160 may provide the peak detected signal 163, the fractional delay signal 165, and the buffered CS synchronous packet 161 in the correlation buffer 162 when the correlation peak is found for the CS synchronization pattern fitting module 170 to detect distortion in the sampled frame synchronization pattern to determine whether there is a MITM attack.

Figure 5:
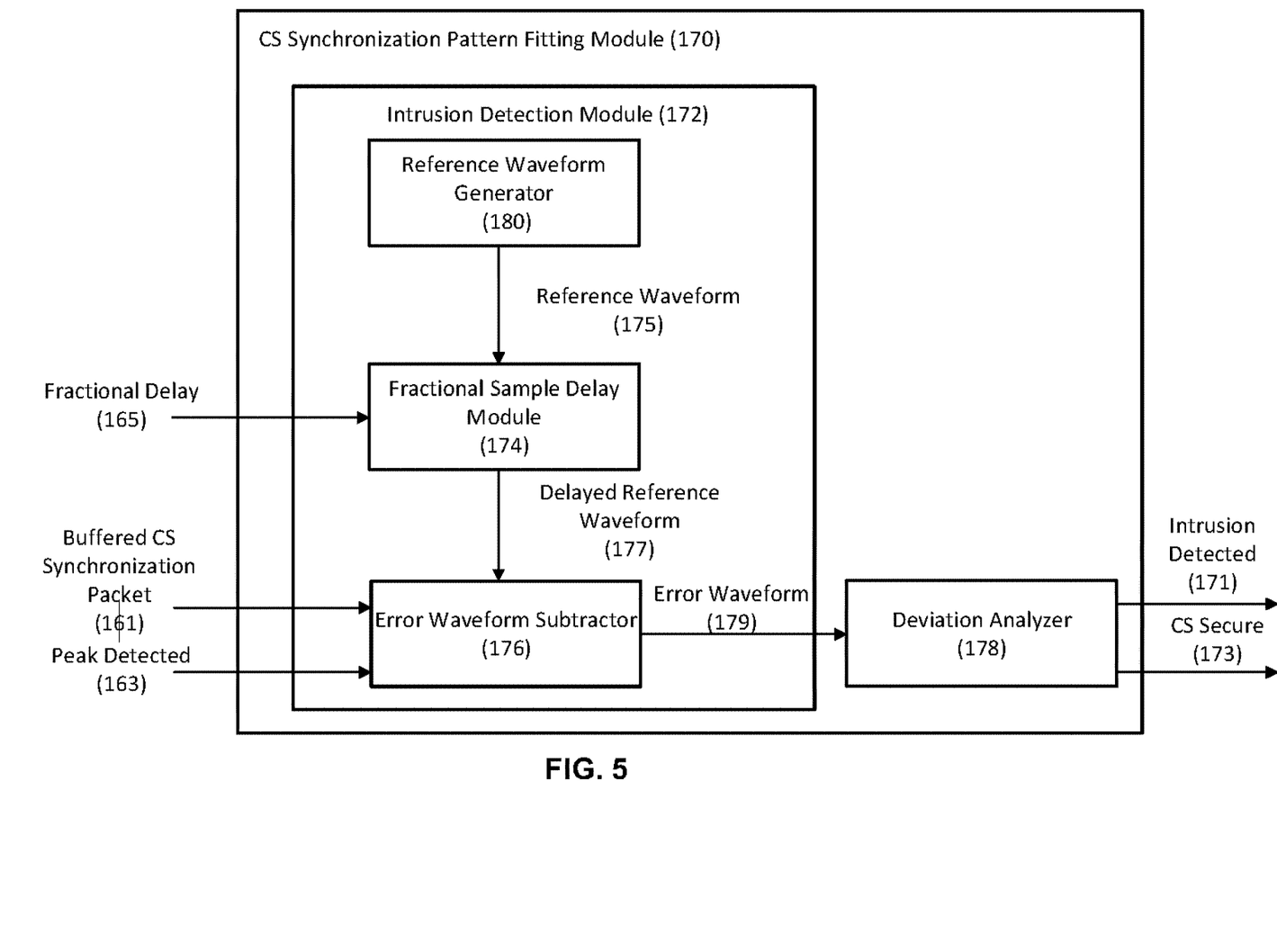
FIG. 5 illustrates a block diagram of a frame synchronization pattern analysis module of the communication interface configured to fit the received signal of the detected frame synchronization packet to the expected frame synchronization pattern to determine whether the received frame synchronization pattern was transmitted by a MITM attacker or a secure keyless entry device, in accordance with one aspect of the present disclosure.

FIG. 5 illustrates a block diagram of a frame synchronization pattern analysis module such as the CS synchronization pattern fitting module 170 of the communication interface 106 configured to fit the received signal of the detected frame synchronization packet to the expected frame synchronization pattern to determine whether the received frame synchronization pattern was transmitted by a MITM attacker or a secure keyless entry device, in accordance with one aspect of the present disclosure. The CS synchronization pattern fitting module 170 may include an intrusion detection module 172 to generate deviations of the received frame synchronization pattern from the expected frame synchronization pattern and a deviation analyzer 178 to analyze the deviation waveform.

The intrusion detection module 172 may include a reference waveform generator 180 configured to generate a reference waveform based on the known frame synchronization pattern, a fractional sample delay module 174 configured to generate a delayed version of the reference waveform based on the position of the correlation peak expressed in fractional sample resolution to represent the expected received frame synchronization pattern, and an error waveform subtractor 176 configured to generate deviations of the received frame synchronization pattern from what is expected. In one embodiment, a device other than the central wireless device (CD) may perform frame synchronization pattern analysis to determine whether the received frame synchronization pattern was transmitted by a MITM attacker. For example, the CS synchronization detection module 160 may provide to an external device fractional sample position of the correlation peak and the sampled data of the frame synchronization pattern in the correlation buffer 162 when frame synchronization is detected. The external device may use the provided information to generate a deviation waveform and may analyze the deviation waveform to detect an attack.

Figure 6:
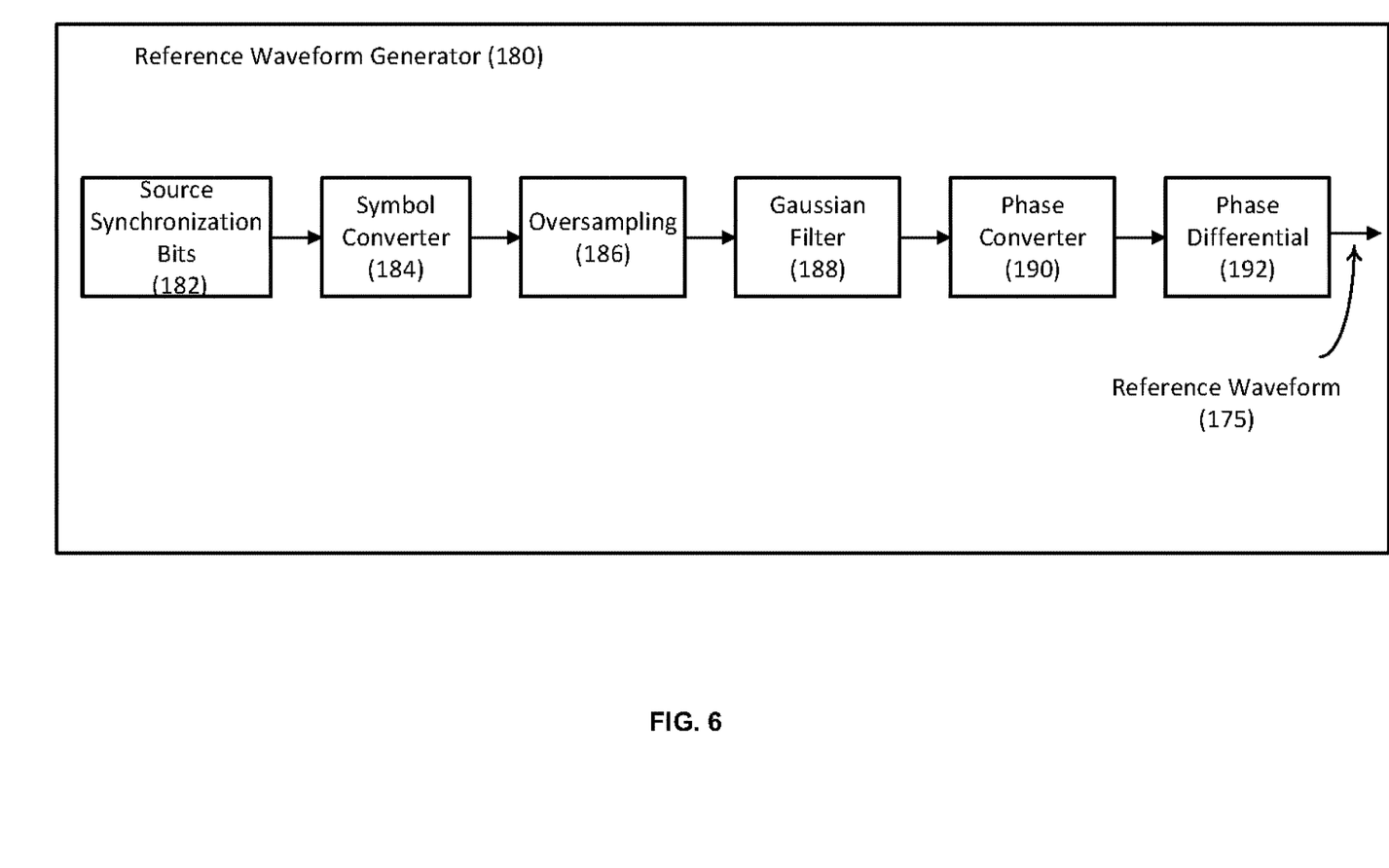
FIG. 6 illustrates a block diagram of a reference waveform generator configured to generate a reference waveform that may be matched and compared to the received frame synchronization pattern to determine deviations indicative of a MITM attack, in accordance with one aspect of the present disclosure.

FIG. 6 illustrates a block diagram of a reference waveform generator 180 configured to generate a reference waveform 175 that may be matched and compared to the received frame synchronization pattern to determine deviations indicative of a MITM attack, in accordance with one aspect of the present disclosure. The reference waveform generator 180 illustrates the processing to generate a Gaussian FSK (GFSK) modulated phase-differential waveform for the BLE network. Reference waveforms based on other modulation schemes used for other PAN networks are possible.

The frame synchronization pattern is known a-priori so the reference waveform 175 may be pre-generated in a manner similar to the generation of the frame synchronization pattern for transmission. In one embodiment, to reduce memory usage, the reference waveform 175 may be generated on-the-fly in a piece-meal approach such as on a symbol-by-symbol basis for the reference symbol waveform (e.g., 6 samples) to be matched and compared to the corresponding symbol of the received frame synchronization pattern. In one embodiment, the reference waveform generator 180 may generate the reference waveform 175 to take into account characteristics of the channel such as the inter-symbol interference (ISI) or the channel estimates 141 provided by the baseband channel estimator 140.

To generate the reference waveform 175, a symbol converter 184 may convert the source bits 182 of the frame synchronization pattern into FSK-modulated symbols. The source bits 182 may be the same as those used to generate the local copy of the frame synchronization pattern for the correlator. An oversampling module 186 may oversample the symbols to match the oversampling ratio of the received frame synchronization pattern. In one embodiment, the oversampling ratio may be 6× of the symbol rate. A Gaussian filter 188 may filter the FSK-modulated symbols to generate GSFK modulated symbols.

A phase converter 190 may convert the samples of the symbols to phase representation. In one embodiment, the phase converter 190 may drop the magnitude of the samples to obtain the phase. In the example of 1 Mbps symbol rate and 6 MHz sampling rate, if the FSK modulation is ±250 KHz, the phase of consecutive samples from a symbol may change by ±15°. A phase differential module 192 may generate the phase differential between samples separated by one symbol to generate the reference waveform 175. In the same example of 1 Mbps symbol rate, 6 MHz sampling rate, and FSK modulation of ±250 KHz, the phase differential between samples separated by one symbol is ±90°. The phase differential approach for the reference waveform 175 may be the same as that used to generate the phase differential sampled data of the received frame synchronization pattern. In other embodiments, the samples of the reference waveform may be in the I/Q domain to preserve both the magnitude and phase information. For example, the reference waveform may be generated in the differential format in the I/Q domain to represent differences in both phase and in magnitude between samples separate by one symbol.

Referring back to FIG. 5. The fractional sample delay module 174 may delay the reference waveform 175 based on the fractional delay 165 representing the position of the correlation peak expressed in fractional sample resolution from the peak detection engine 166 to generate the delayed reference waveform 177. The delayed reference waveform 177 may represent the expected frame synchronization pattern that is matched with the sampled data of the received frame synchronization pattern in the correlation buffer 162 when frame synchronization is detected.

Upon the detection of frame synchronization as indicated by the peak detected signal 163 from the peak detection engine 166, the error waveform subtractor 176 may subtract the delayed reference waveform 177 from the buffered CS synchronous packet 161 in the correlation buffer 162 to generate the error waveform 179. The error waveform 179 represents deviations in the waveform of the sampled data of the received frame synchronization pattern from the expected frame synchronization pattern. In one embodiment, when the received frame synchronization pattern and the expected frame synchronization are represented in phase differential format, the phase differential data of the delayed reference waveform 177 may be subtracted from the phase differential data of buffered CS synchronous packet 161 to generate the error waveform 179 of phase deviations. In one embodiment, when the received frame synchronization pattern and the expected frame synchronization are represented in differential format in the I/Q domain, the error waveform 179 may include both phase deviations and magnitude deviations. In one embodiment, the error waveform subtractor 176 may generate deviation data for all symbols of the frame synchronization pattern at one time for analysis. In one embodiment, to reduce memory usage, the delayed reference waveform may be generated one symbol (e.g., 6 sampled) at a time, and the error waveform subtractor 176 may generate deviations symbol-by-symbol for analysis.

The deviation analyzer 178 may analyze the error waveform 179 to detect distortions characteristics of an attack. In one embodiment, when the error waveform 179 represents phase deviations, the magnitude of the peak phase deviation of the error waveform 179 is compared with a predetermined phase threshold to detect an attack. The deviation analyzer may generate an intrusion detected signal 171 to identify an attack when the peak phase deviation magnitude exceeds the phase threshold, or otherwise generate a CS secure indication 173 to identify a secure device.

In one embodiment, when the error waveform 179 is in the I/Q domain, the peak magnitude deviation and the magnitude of the peak phase deviation of the error waveform 179 are compared with a magnitude threshold and a phase threshold, respectively, to detect an attack. In one embodiment, the deviation analyzer 178 may analyze the signatures or the pattern of the error waveform 179 to detect distortions characteristics of an attack. For example, if the largest deviation peaks align with symbol transitions of the frame synchronization pattern (when the attacker assumes consecutive symbols are the same polarity), or alternatively with symbol repetitions of the frame synchronization pattern (when the attacker assumes consecutive symbols have opposite polarities), the deviation analyzer 178 may generate the intrusion detected signal 171. In one embodiment, when an attack is identified, the error waveform 179 may be further filtered to search for specific patterns.

Figure 7:
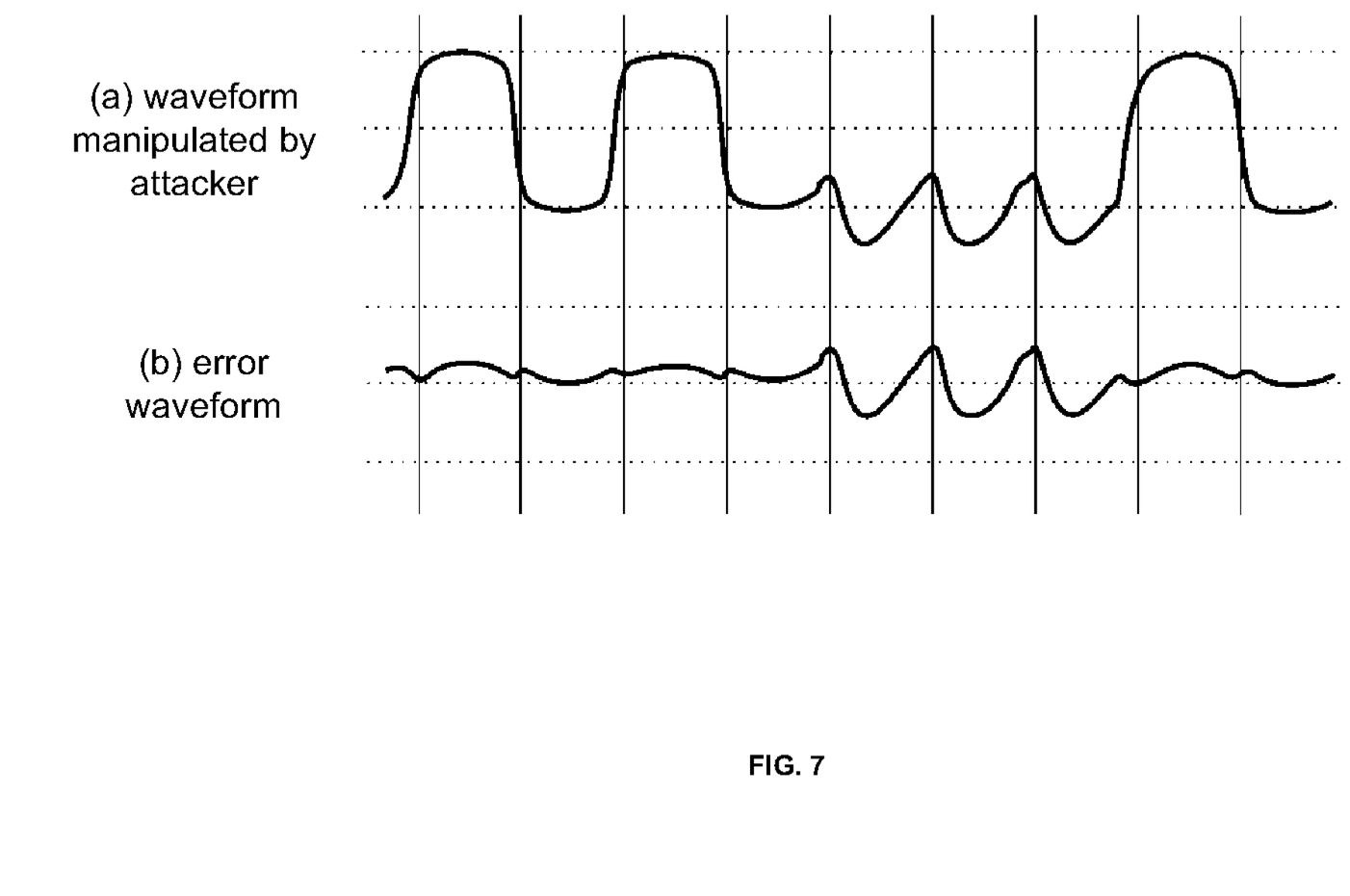
FIG. 7 illustrates an example of deviations of the received frame synchronization pattern from the expected frame synchronization pattern to determine a MITM attack, in accordance with one aspect of the present disclosure.

FIG. 7 illustrates an example of deviations of the received frame synchronization pattern from the expected frame synchronization pattern to determine a MITM attack, in accordance with one aspect of the present disclosure. FIG. 7(*a*) illustrates a waveform of a few manipulated symbols of the frame synchronization pattern from an intruder's device. Similar to the waveform in FIG. 2(*b*), the intruder's device has assumed that consecutive symbols have the opposite polarities and may quickly change the polarities when symbols repeat, causing waveform distortions at the beginning of repeated symbols characteristics of an ECLD attack.

FIG. 7(*c*) illustrates the error waveform after an expected frame synchronization pattern, such as the delayed reference waveform 177 of FIG. 5, has been subtracted from the manipulated waveform. The error waveform shows large distortions that align with symbol repetitions. By comparing the peak distortions with a threshold or by analyzing the positions of the wave distortions, the ECLD attack may be identified.

Figure 8:
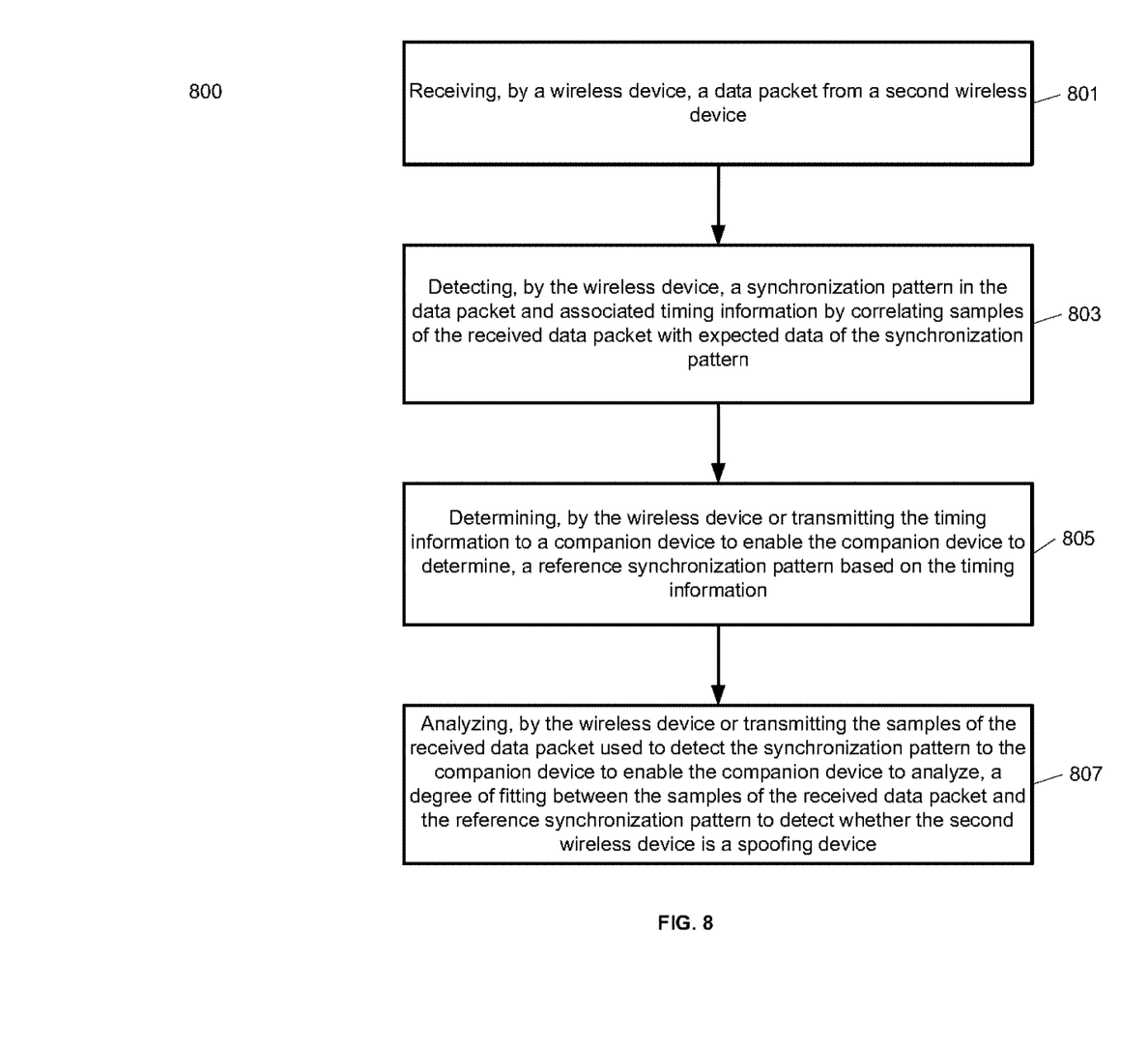
FIG. 8 illustrates a flow diagram of a method for operating a device to process a frame synchronization pattern received from a second device to determine a MITM attack, in accordance with one aspect of the present disclosure.

FIG. 8 illustrates a flow diagram of a method 800 for operating a device to process a frame synchronization pattern received from a second device to determine a MITM attack, in accordance with one aspect of the present disclosure. In one aspect, the method 800 may be performed by a device utilizing hardware, software, or combinations of hardware and software.

In operation 801, a wireless device receives a data packet from a second wireless device. The wireless device may be a CD device of a BLE network receiving frame synchronization packets containing frame synchronization patterns from a PD device.

In operation 803, the wireless device detects a synchronization pattern in the data packet and associated timing information by correlating samples of the received data packet with expected data of the synchronization pattern. A correlator may detect a correlation peak from the correlation and may generate timing information indicating the position of the correlation peak expressed in fractional sample resolution when the received data packet contains the synchronization pattern.

In operation 805, the wireless device determines a reference synchronization pattern based on the timing information. The wireless device may also transmit the timing information to a companion device to enable the companion device to determine the reference synchronization pattern based on the timing information. The reference synchronization pattern may represent the expected synchronization pattern to be matched and compared with the received synchronization pattern. The reference synchronization pattern may have a finer time resolution than the synchronization pattern used to correlate with the samples of the received data packet to detect the synchronization pattern.

In operation 807, the wireless device analyzes a degree of fitting between the samples of the received data packet and the reference synchronization pattern to detect whether the second wireless device is a spoofing device. The wireless device may also transmit the samples of the received data packet used to detect the synchronization packet to the companion wireless device to enable the companion device to analyze a degree of fitting between the samples of the received data packet and the reference synchronization pattern to detect whether the second wireless device is a spoofing device. In one aspect, the reference synchronization pattern may be subtracted from the received data packet to generate a deviation waveform. Peak distortions of the deviation waveform may be compared with a threshold to detect that the synchronization pattern in the received data packet is transmitted from a spoofing device.

Various embodiments of the multi-carrier phase-based ranging system described herein may include various operations. These operations may be performed and/or controlled by hardware components, digital hardware and/or firmware/programmable registers (e.g., as implemented in computer-readable medium), and/or combinations thereof. For example, the operations may be performed by a general-purpose computer or a processing system executing computer program stored in a computer-readable medium. The methods and illustrative examples described herein are not inherently related to any particular device or other apparatus. Various systems (e.g., such as a wireless device operating in a near or long field environment, pico area network, wide area network, etc.) may be used in accordance with the teachings described herein, or it may prove convenient to construct more specialized apparatus to perform the required method steps. The required structure for a variety of these systems will appear as set forth in the description above.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of operations by a wireless device, comprising:

receiving, by the wireless device, a data packet from a second wireless device;

detecting, by the wireless device, a synchronization pattern in the data packet and associated timing information by correlating samples of the received data packet with expected data of the synchronization pattern to generate a correlation peak over a plurality of symbols of the synchronization pattern and determining that the correlation peak exceeds a threshold, the timing information being associated with a position of the correlation peak and representing a time of arrival of the synchronization pattern with a time resolution finer than a resolution of a sampling rate of the synchronization pattern in round trip timing (RTT)-based ranging, the sampling rate being higher than a symbol rate of the plurality of symbols;

determining, by the wireless device, or transmitting the timing information to a companion device to enable the companion device to determine, a reference synchronization pattern based on the timing information;

analyzing, by the wireless device, or transmitting the samples of the received data packet used to detect the synchronization pattern to the companion device to enable the companion device to analyze, a level of fitting between the samples of the received data packet and the reference synchronization pattern at boundaries of symbol transitions or symbol repetitions of the synchronization pattern to detect whether the symbols of the synchronization pattern have been manipulated; and locking access to a secured resource in response to detecting the symbols of the synchronization pattern as having been manipulated.

2. The method of claim 1, wherein the plurality of symbols are associated with the symbol rate, and wherein the samples of the received data packet are obtained by sampling the received data packet at the sampling rate higher than the symbol rate.

3. The method of claim 2, wherein
the reference synchronization pattern has a time resolution finer than the resolution of the sampling rate.

4. The method of claim 2, wherein the samples of the data packet comprise a number of samples of the synchronization pattern equaling to a product of the symbol rate and the sampling rate.

5. The method of claim 3, wherein determining the reference synchronization pattern comprises:
generating an expected waveform of the synchronization pattern at the sampling rate; and
adjusting the expected waveform by the position of the correlation peak to generate the reference synchronization pattern.

6. The method of claim 1, wherein the samples of the received data packet comprises a plurality of phases of the received data packet sampled at the sampling rate, and wherein the reference synchronization pattern comprises a plurality of phases of an expected waveform of the synchronization pattern sampled at the sampling rate and delayed by the timing information.

7. The method of claim 1, wherein the samples of the received data packet comprises a plurality of differences in magnitudes and differences in phases of sampled data of the received data packet separated by one symbol of the synchronization pattern, and wherein the reference synchronization pattern comprises a plurality of differences in magnitudes and differences in phases of sampled data of an expected waveform of the synchronization pattern separated by one symbol of the synchronization pattern, and delayed by the timing information.

8. The method of claim 1, wherein analyzing a level of fitting between the samples of the received data packet and the reference synchronization pattern comprises:
subtracting the reference synchronization pattern from the samples of the received data packet to generate an error waveform;
comparing the error waveform with an error threshold;
determining the second wireless device as a spoofing device in response to the error waveform satisfying the error threshold; and
determining the second wireless device as a secure device in response to the error waveform failing to satisfy the error threshold.

9. The method of claim 8, wherein the error waveform is represented in magnitude and phase, and wherein the error threshold comprises a peak magnitude deviation threshold and a peak phase deviation threshold.

10. The method of claim 1, wherein analyzing a level of fitting between the samples of the received data packet and the reference synchronization pattern comprises:
subtracting the reference synchronization pattern from the samples of the received data packet to generate an error waveform; and
analyzing a pattern of the error waveform corresponding to symbol boundaries of the synchronization pattern to detect whether the second wireless device is a spoofing device or a secure device.

11. The method of claim 1, further comprising:
permitting the second wireless device to access a secured resource in response to detecting the symbols of the synchronization pattern as not having been manipulated.

12. An apparatus comprising:
a wireless device configured to:
receive a data packet from a second wireless device;
detect a synchronization pattern in the data packet and associated timing information by correlating samples of the received data packet with expected data of the synchronization pattern to generate a correlation peak over a plurality of symbols of the synchronization pattern and determine that the correlation peak exceeds a threshold, the timing information being associated with a position of the correlation peak and representing a time of arrival of the synchronization pattern with a time resolution finer than a resolution of a sampling rate of the synchronization pattern in round trip timing (RTT)-based ranging, the sampling rate being higher than a symbol rate of the plurality of symbols;
determine a reference synchronization pattern based on the timing information;
analyze a level of fitting between the samples of the received data packet and the reference synchronization pattern at boundaries of symbol transitions or symbol repetitions of the synchronization pattern to detect whether the symbols of the synchronization pattern have been manipulated; and
lock access to a secured resource in response to detecting that the symbols of the synchronization pattern have been manipulated.

13. The apparatus of claim 12, wherein the plurality of symbols are associated with the symbol rate, and wherein the samples of the received data packet are obtained by sampling the received data packet at the sampling rate higher than the symbol rate.

14. The apparatus of claim 13, wherein
the reference synchronization pattern has a time resolution finer than the resolution of the sampling rate.

15. The apparatus of claim 14, wherein to determine the reference synchronization pattern, the wireless device is configured to:
  generate an expected waveform of the synchronization pattern at the sampling rate; and
  adjust the expected waveform by the position of the correlation peak to generate the reference synchronization pattern.

16. The apparatus of claim 12, wherein the samples of the received data packet comprises a plurality of phases of the received data packet sampled at the sampling rate, and wherein the reference synchronization pattern comprises a plurality of phases of an expected waveform of the synchronization pattern sampled at the sampling rate and delayed by the timing information.

17. The apparatus of claim 12, wherein the samples of the received data packet comprises a plurality of differences in magnitudes and differences in phases of sampled data of the received data packet separated by one symbol of the synchronization pattern, and wherein the reference synchronization pattern comprises a plurality of differences in magnitudes and differences in phases of sampled data of an expected waveform of the synchronization pattern separated by one symbol of the synchronization pattern, and delayed by the timing information.

18. The apparatus of claim 12, wherein to analyze a level of fitting between the samples of the received data packet and the reference synchronization pattern, the wireless device is configured to:
  subtract the reference synchronization pattern from the samples of the received data packet to generate an error waveform;
  compare the error waveform with an error threshold;
  determine the second wireless device as a spoofing device in response to the error waveform satisfying the error threshold; and
  determine the second wireless device as a secure device in response to the error waveform failing to satisfy the error threshold.

19. The apparatus of claim 18, wherein the error waveform is represented in magnitude and phase, and wherein the error threshold comprises a peak magnitude deviation threshold and a peak phase deviation threshold.

20. A system comprising:
  an antenna;
  a receiver configured to receive a data packet from a wireless device via the antenna;
  a host processor;
  a communication processor coupled to the receiver; and
  a memory configured to store instructions, which when executed by the communication processor, cause the communication processor to:
    detect a synchronization pattern in the data packet and associated timing information by correlating samples of the received data packet with expected data of the synchronization pattern to generate a correlation peak over a plurality of symbols of the synchronization pattern and determine that the correlation peak exceeds a threshold, wherein the timing information is associated with a position of the correlation peak and represents a time of arrival of the synchronization pattern with a time resolution finer than a resolution of a sampling rate of the synchronization pattern in round trip timing (RTT)-based ranging to estimate a range to the wireless device, the sampling rate being higher than a symbol rate of the plurality of symbols,
  wherein the host processor is configured to:
  determine a reference synchronization pattern based on the timing information;
  analyze a level of fitting between the samples of the received data packet and the reference synchronization pattern at boundaries of symbol transitions or symbol repetitions of the synchronization pattern to detect whether the symbols of the synchronization pattern have been manipulated; and
  lock access to a secured resource in response to detecting that the symbols of the synchronization pattern have been manipulated.

* * * * *